(12) United States Patent
Cruz-Aguilar et al.

(10) Patent No.: US 9,742,685 B2
(45) Date of Patent: *Aug. 22, 2017

(54) ENHANCED MECHANISMS FOR GRANTING ACCESS TO SHARED RESOURCES

(71) Applicant: International Business Machines Corporation, Armonk, NY (US)

(72) Inventors: Esdras E. Cruz-Aguilar, Austin, TX (US); Perinkulam I. Ganesh, Round Rock, TX (US); Madhusudanan Kandasamy, Gobichettipalayam (IN); Charles E. Meyer, Austin, TX (US); Stephen J. Tovcimak, Red Hook, NY (US)

(73) Assignee: International Business Machines Corporation, Armonk, NY (US)

( * ) Notice: Subject to any disclaimer, the term of this patent is extended or adjusted under 35 U.S.C. 154(b) by 812 days.

This patent is subject to a terminal disclaimer.

(21) Appl. No.: 14/037,765

(22) Filed: Sep. 26, 2013

(65) Prior Publication Data

US 2015/0089059 A1 Mar. 26, 2015

(51) Int. Cl.
*G06F 15/173* (2006.01)
*H04L 12/911* (2013.01)
*H04L 29/08* (2006.01)
*H04L 29/06* (2006.01)
*H04L 12/24* (2006.01)
*H04L 12/26* (2006.01)

(52) U.S. Cl.
CPC .......... *H04L 47/70* (2013.01); *H04L 41/0893* (2013.01); *H04L 67/104* (2013.01);
(Continued)

(58) Field of Classification Search
CPC ............................ H04L 47/70; H04L 41/0893
(Continued)

(56) References Cited

U.S. PATENT DOCUMENTS

| | | | |
|---|---|---|---|
| 5,774,731 A | 6/1998 | Higuchi et al. | |
| 6,105,099 A * | 8/2000 | Freitas ...................... | G06F 9/52 370/231 |

(Continued)

FOREIGN PATENT DOCUMENTS

CN 103297456 A 9/2013

OTHER PUBLICATIONS

U.S. Appl. No. 14/083,622.
(Continued)

*Primary Examiner* — Dustin Nguyen
*Assistant Examiner* — Joel Mesa
(74) *Attorney, Agent, or Firm* — Stephen J. Walder, Jr.; Thomas E. Tyson

(57) ABSTRACT

Mechanisms are provided, in a data processing system comprising a plurality of nodes, each node being a computing device, for controlling access to a critical section of code. These mechanisms send, by a sender node of the data processing system, an access request for requesting access to the critical section of code. The critical section of code is a portion of code that accesses a shared resource. The mechanisms receive, in the sender node, from a plurality of receiver nodes in the data processing system, responses to the access request. Each response in the responses includes a number of active nodes perceived by a corresponding receiver node that transmitted the response. The mechanisms control, by the sender node, access to the critical section of code based on the number of active nodes identified in each of the responses received from the receiver nodes.

18 Claims, 4 Drawing Sheets

(52) U.S. Cl.
CPC .......... *H04L 69/28* (2013.01); *H04L 43/0817* (2013.01); *H04L 43/10* (2013.01)

(58) Field of Classification Search
USPC ................................................ 709/225, 223
See application file for complete search history.

(56) References Cited

U.S. PATENT DOCUMENTS

| | | | |
|---|---|---|---|
| 6,950,853 | B2 | 9/2005 | Garcia-Luna-Aceves et al. |
| 7,280,536 | B2 | 10/2007 | Testardi |
| 8,239,518 | B2 | 8/2012 | Wipfel et al. |
| 2008/0177741 | A1 | 7/2008 | Joshi et al. |
| 2010/0083268 | A1 | 4/2010 | Morris |
| 2013/0080559 | A1* | 3/2013 | Rao .................... H04L 67/1097 709/208 |

OTHER PUBLICATIONS

International Search Report and Written Opinion dated Nov. 28, 2014 for International Application No. PCT/CN2014/086385, 11 pages.

"Ricart-Agrawala algorithm", Wikipedia, http://en.wikipedia.org/wiki/Ricart%E2%80%93Agrawala_algorithm, last modified Jul. 5, 2013, accessed on Jul. 17, 2013, 3 pages.

Atreya, Ranganath et al., "A Quorum-Based Group Mutual Exclusion Algorithm for a Distributed System with Dynamic Group Set", IEEE Transactions on Parallel and Distributed Systems, vol. 18, No. 10, Oct. 2007, pp. 1345-1360.

Banerjee, Sujata et al., "A New Token Passing Distributed Mutual Exclusion Algorithm", Proceedings of the 16th International Conference on Distributed Computing Systems, 1996, pp. 717-724.

Joung, Yuh-Jzer, "Quorum-Based Algorithms for Group Mutual Exclusion", IEEE Transactions on Parallel and Distributed Systems, vol. 14, No. 5, May 2003, pp. 463-476.

Madenur, Vinay et al., "A Delay-Optimal Group Mutual Exclusion Algorithm for a Tree Network", Technical Report No. UTDCS-24-06, Department of Computer Science, the University of Texas at Dallas, USA, 2006, pp. 1-8.

Parameswaran, Murali et al., "A Novel Permission-based Reliable Distributed Mutual Exclusion Algorithm for MANETs", 2010 Seventh International Conference on Wireless and Optical Communications Networks (WOCN), 2010, 6 pages.

Ricart, Glenn et al., "An Optimal Algorithm for Mutual Exclusion in Computer Networks", Communications of the ACM, vol. 24, Issue 1, Jan. 1981, pp. 9-17.

* cited by examiner

ENHANCED MECHANISMS FOR GRANTING ACCESS TO SHARED RESOURCES

BACKGROUND

The present application relates generally to an improved data processing apparatus and method and more specifically to mechanisms for granting access to shared resources.

The Ricart-Agrawala algorithm is an algorithm for mutual exclusion on a distributed system. This algorithm was developed by Glenn Ricart and Ashok Agrawala, and is an extension and optimization of Lamport's Distributed Mutual Exclusion Algorithm which removes the need for release messages. With the Ricart-Agrawala algorithm, when a node (computing device) in a distributed environment needs to enter a critical section, i.e. a portion of code that accesses a shared resource (e.g., a data structure, device, or the like) that must not be concurrently accessed by other nodes, the node sends a notification to all the other nodes of which it is aware indicating the need to enter the critical section.

In response to receiving the notification, the receiving nodes, if not in the critical section, i.e. not accessing the shared resource, or is about to enter the critical section but has a lower priority value than the sender node, will approve the grant of access to the critical section by the sender node. If the receiving node is already in the critical section, i.e. accessing the shared resource, the receiving node will not approve the grant of access to the critical section by the sender node.

After the lapse of a wait time, the sender node determines if it has received response messages from all of the receiving nodes indicating approval of the grant of the access to the critical section. If so, the sender node will enter the critical section and access the shared resource. If the sender node does not get approval of the grant of access to the critical section, the sender node will again send out the notification and await responses, basically repeating the attempt to obtain access to the critical section.

SUMMARY

In one illustrative embodiment, a method, in a data processing system comprising a plurality of nodes, each node being a computing device, for controlling access to a critical section of code. The method comprises sending, by a sender node of the data processing system, an access request for requesting access to the critical section of code. The critical section of code is a portion of code that accesses a shared resource. The method further comprises receiving, by the sender node, from a plurality of receiver nodes in the data processing system, responses to the access request. Each response in the responses includes a number of active nodes perceived by a corresponding receiver node that transmitted the response. In addition, the method comprises controlling, by the sender node, access to the critical section of code based on the number of active nodes identified in each of the responses received from the receiver nodes.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
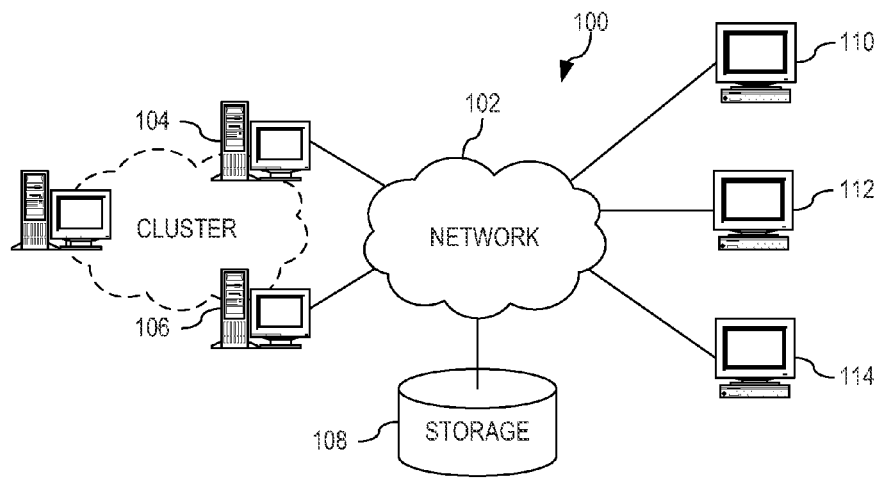
FIG. 1 is an example diagram of a distributed data processing system in which aspects of the illustrative embodiments may be implemented.

As mentioned above, the Ricart-Agrawala algorithm may be used to control access to critical sections of code that are used to access a shared resource, e.g., data structure, device, or the like. The Ricart-Agrawala algorithm works well in networks where it is known how many nodes (computing devices) are operational, this number of nodes remains steady, and each node has connectivity to each other node in the distributed network. In a practical situation, however, where nodes are scattered over geographical boundaries, such as in the case of cloud computing or the like, this is not always the case. Nodes exchange heart beat messages to sense the topology which may be constantly or periodically changing as nodes get added, removed, lose network connection, get expelled from the network, or the like. The heart beat messages essentially inform all of the nodes, to which a node transmitting the heart beat message is connected, that a particular node is operational. The receiving nodes must updating their own data structures listing the operational nodes based on these heart beat message to indicate which nodes the receiving nodes "sees" as being operational. If a heart beat message is not received from a node within a predetermined period of time, the node may either not be detected as being part of the topology or may be considered to not be operational by the other nodes.

Sensing the topology of the distributed network takes a significant amount of time, e.g., several seconds. As a result, the Ricart-Agrawala algorithm, as it is currently known, cannot be implemented in distributed networks where nodal membership in the distributed network fluctuates and as a result, the sensing of the distributed network topology is needed. There are a number of considerations that cause the known Ricart-Agrawala algorithm to not be adequately implemented in topology sensing networks.

A first consideration is how soon an access to a critical section can be requested after a node is made operational. That is, a node can be randomly booted, rebooted, and shutdown. After a reboot, if a node finds no other node operational, there may be two possibilities: either the node is the only node that is operational, or enough time has not lapsed to exchange heart beat messages. Hence a node should not request access to a critical section of code immediately after boot or reboot. However, with the known Ricart-Agrawala algorithm, there are no controls over how soon after boot or reboot of a node, the node can request access to a critical section of code. Herein, accessing a critical section of code is used herein interchangeably with the concept of accessing a shared resource, such as a data structure, device, or the like, since the critical section of code is a portion of code executed to access a shared resource.

A second consideration is how to ensure that it is safe to access a critical section when the rest of the nodes approve of the access by the requesting node to the critical section. When a node needs to gain an exclusive right to a shared resource (data structure, device, or the like) by accessing a critical section, it may not be possible to ascertain the right number of nodes in the distributed environment. As a result, access to the shared resource may be granted erroneously. For example, suppose there are four nodes A, B, C, and D. If node A is aware of only nodes B and C, then node A will send notifications, or requests, to only nodes B and C requesting approval of node A's access to the critical section and thus, the shared resource. Nodes B and C may not be in a critical section while node D may actually be in the critical section of code. Thus, nodes B and C would approve, or grant, node A's access to the critical section and thus, the shared resource, and as a result, nodes A and D would both be in the critical section simultaneously and would have simultaneous access to the corresponding shared resource which should only be accessed sequentially. Thus, a sender of an access notification or request should not blindly accept access granted responses from receiving nodes.

A third consideration is when a node should not request access to a critical section or shared resource. Normally, when a node or a set of nodes has an asymmetric view of the distributed network of nodes, they will tend to bring themselves down, i.e. to an inoperable state. This, however, does not happen instantaneously and therefore, during this period of time when the node is bringing itself down, the node may still respond to access requests and send out access requests. This may cause shared access problems similar to that noted above since a node with an asymmetric view is providing incomplete responses and sending out requests to an incomplete set of nodes.

The illustrative embodiments provide mechanisms for granting access to shared resources and more specifically to accessing a critical section of code that in turn accesses a shared resource. The illustrative embodiments provide mechanisms for addressing the three main considerations noted above. In order to address the first consideration above directed to how soon an access request should be allowed to be sent by a node after boot or reboot, the illustrative embodiments provide mechanisms for controlling a node such that if a node becomes operational, such as through a boot operation, reboot operation, or the like, the node determines if there is a quorum of other nodes (i.e. at least half or more of a predefined number of nodes) operational in the network or cluster of nodes (the illustrative embodiments may operate on any set of a plurality of nodes and may be referred to as a network, a cluster, or the like).

When the cluster of nodes is configured, a number of nodes in the cluster is known and communicated to the nodes of the cluster. The nodes of the cluster exchange heartbeat messages to indicate that the nodes are still operational within the cluster. If a heartbeat message is not received from a node within a predetermined period of time, the node may be determined to be non-operational. Thus, by tracking which nodes have sent heartbeat signals and compare the total number of operational nodes to the predetermined number of nodes in the cluster, a determination may be made as to whether a quorum of nodes is available.

If a quorum of nodes is not available when the current node comes up, then the node has to wait for a predetermined delay timeout period before requesting access to the critical section of code, and thus, the shared resource. The delay timeout period is a tunable value that is dependent upon the particular implementation. The delay timeout period is preferably set to a period of time to allow nodes to be brought up and heartbeat messages to be exchanged between the nodes of the cluster. If a quorum of nodes is not able to be obtained, then cluster-wide access is denied at the sender node itself, i.e. the sending of access notifications/requests is inhibited at the sender node.

To address the second consideration above with regard to ensuring that it is safe to enter a critical section even when the other nodes of the cluster approve the access to the critical section, mechanisms are provided in the illustrative embodiment to exchange information between the nodes of the cluster indicating how many nodes each other node perceives as being operational in the cluster. That is, when a node boots up or is added to a cluster, the node transitions from a "DOWN" state to a "DOWNBEAT" state, i.e. a state where the node is capable of sending out heartbeat messages but has not yet become an operational member of the cluster. After the DOWNBEAT state, the node transitions to an "UP" state where the node is a fully qualified member of the cluster. Whether a node is in a DOWNBEAT state or an UP state, the node is capable of accessing critical sections of code and hence needs to participate in the access grant/denial functionality of the cluster. Nodes that are in a DOWNBEAT state or UP state are referred to as "active" nodes, whereas nodes that are in a DOWN state are referred to as "inactive" nodes.

In accordance with the illustrative embodiments, to ensure that a sender node does not rely just on the receiver nodes' responses granting the sender node's requested access to the critical section or shared resource, when nodes respond to an access notification or request, in addition to sending the response indicating whether the access requested is granted or denied, the nodes also send the number of nodes they perceive to be active nodes in the cluster. The sender node, when receiving such responses from the receiving nodes in the cluster, compares the number of active nodes perceived by the receiving nodes to the number of active nodes perceived by the sender node. If the sender node determines that there is a discrepancy between these numbers of active nodes, then the sender node will deny itself access to the critical section or shared resource even though the receiver nodes have responded with a grant of the requested access.

For example, using the previous example above with nodes A, B, C, and 13, assume that node B is able to detect that node D is in an up state (such as due to receipt of a heartbeat message from node D). Also assume that nodes C and A do not have visibility of node D, either because a connection to node D is down, node D is actually in a down state, or some other error has occurred making node D not visible to nodes C and A. Assume that nodes B and C perceive node A to be in a downbeat state.

In this scenario, when node A sends out an access notification or request, node B sends the response <3, 1, OK>, where the response format is of the type <# of UP nodes, # of DOWNBEAT nodes, access grant/deny>. Similarly, node C sends a response of <2, 1, OK>. Whether an active node is in an UP state or DOWNBEAT state is indicated in the heartbeat messages being sent out by the specific not. That is, the heartbeat signal contains a state indicator value that indicates either an UP state or a DOWNBEAT state. This information is stored by each other receiving node that receives the heartbeat signal so that each node has their own respective view of which nodes are UP and which nodes are in a DOWNBEAT state. As such, each node is able to calculate the number of UP nodes and number of DOWNBEAT nodes it perceives in the cluster topology.

Of course the above format of the response is only an example and other formats may be used. For example, a response may instead of separating out the number of up nodes and number of downbeat nodes, may instead send an active node number which is a sum of the up nodes and downbeat nodes. The main consideration is that the number of nodes perceived by the responding node to be in an active state is returned along with the response indicating whether the responding node grants/denies the requested access.

Returning to the example above, node A sums the number of nodes that are active, i.e. in an UP state and DOWNBEAT state, for each responding node to determine a corresponding active node count for that responding node, unless the embodiment utilizes a response in which this summation has already been done, as noted above. In the above example, the number of active nodes perceived by node B is 4 and for node C is 3. These numbers of active nodes perceived by each of the receiver nodes responding to the access notification/request is compared to the sender node's own perceived number of active nodes, e.g., (2+1)=3 in this case. In this example, the sender node, i.e. node A, active node count matches with node C's active node count but does not match node B's active node count. As a result, since there is not a consistent view of the cluster by all of the nodes, there is the possibility that node A did not send its access notification/request to a node in the cluster that may be in the critical section or accessing the shared resource. Thus, node A denies itself access to the critical section or shared resource even though both nodes B and C indicated approval of the access.

It should be appreciated that if the sender node perceives a larger number of active nodes than all of the responding receiver nodes, then the sender node may grant itself access (assuming that each of the responses indicates approval of the access). This is because the sender node has a larger visibility of the cluster than the responding receiver nodes. For example, if node A's active count is 4 and each of nodes B and C respond with active counts of 3 and approval of the access request, then node A may granted itself access even though there is a discrepancy between its active count and the active count of the responding nodes.

With regard to the third consideration mentioned above, i.e. evaluating when a node should not request access to a critical section after in an UP state, in accordance with the illustrative embodiments, if a node determines that it has an asymmetric view of the cluster, e.g., its number of active nodes is inconsistent with the number of active nodes perceived by other nodes in the cluster, the node may initiate a timer. The node may periodically check its view of the cluster to determine if this asymmetric view persists. During the time interval measured by the timer, the node is in a vulnerable state and should avoid accessing critical sections and shared resources. Thus, sending of access notifications/requests may be inhibited during this time interval until such time as the node determines that it no longer has an asymmetric view. Thus, prior to sending out an access notification/request, the sender node may check to see if the timer has been started. If the timer has been started, the sender node may deny itself access to the critical section/shared resource and inhibit the sending of access notifications/requests. In addition, the node may not approve other node's requests and instead will automatically respond with a denial of any received access notification/request from other nodes of the cluster. If the asymmetric view discontinues, the timer may be canceled and normal operation of the node may be resumed.

Thus, the illustrative embodiments provide mechanisms for controlling access to critical sections of code and shared resources based on the various perceived views of the cluster of nodes from the various nodes of the cluster. Moreover, mechanisms are provided for controlling nodes so as to avoid issues with asymmetric views of a cluster. These mechanisms include waiting a predetermined delay time period for ensuring that heartbeat messages are able to be exchanged between nodes of a cluster. The mechanisms further allow for the exchange of information about each node's perceived view of the number of active nodes in the cluster. Mechanisms are provided for allowing the sender to perform self-denial of access to a critical section/shared resource when appropriate.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
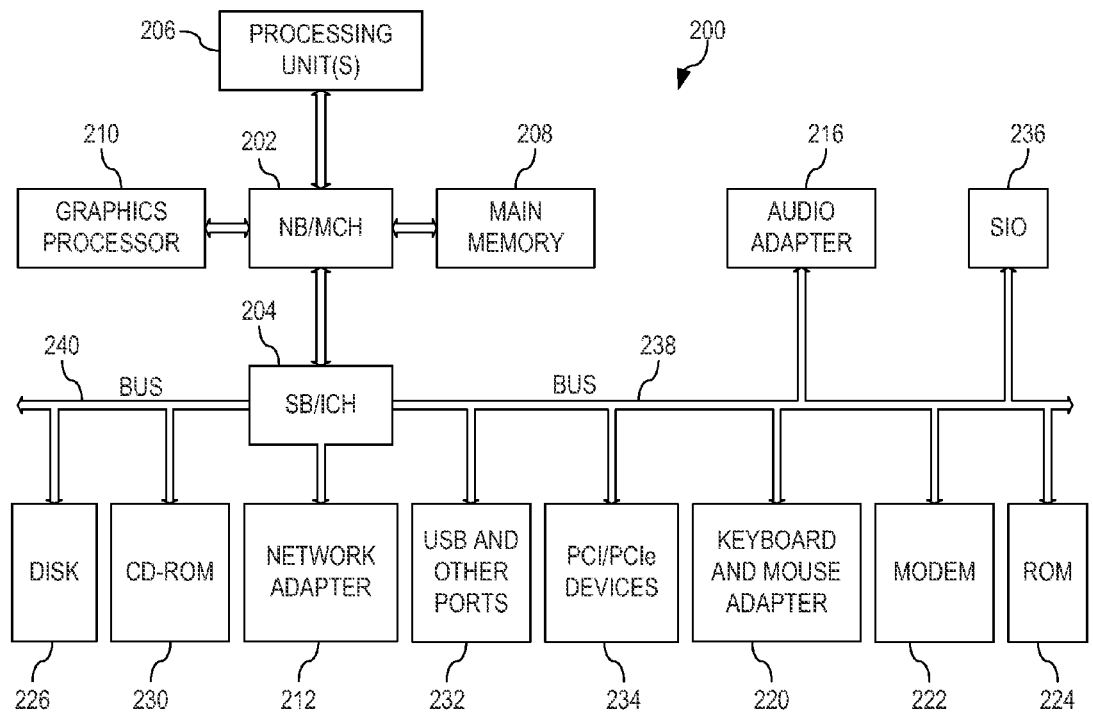
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot flies, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

With reference again to FIG. 1, the servers 104, 106, client computing devices 110-114, or the like may be part of a set of a plurality of computing devices that access shared resources by executing critical sections of code. This set of a plurality of computing devices may be referred to as a network of computing devices, a cluster of computing devices, or the like, and preferably have communication connections between each other such that they may exchange control and data messages. For purposes of this description, it will be assumed that the servers 104, 106, and other servers (not shown) are configured to be a cluster of servers for servicing requests from client computing devices 110-114 via the network 102. Thus, the servers 104, 106, as well as other servers of the cluster, are configured to implement the mechanisms and functionality of the illustrative embodiments. The servers 104, 106 may be data processing systems such as described in FIG. 2, for example.

Figure 3:
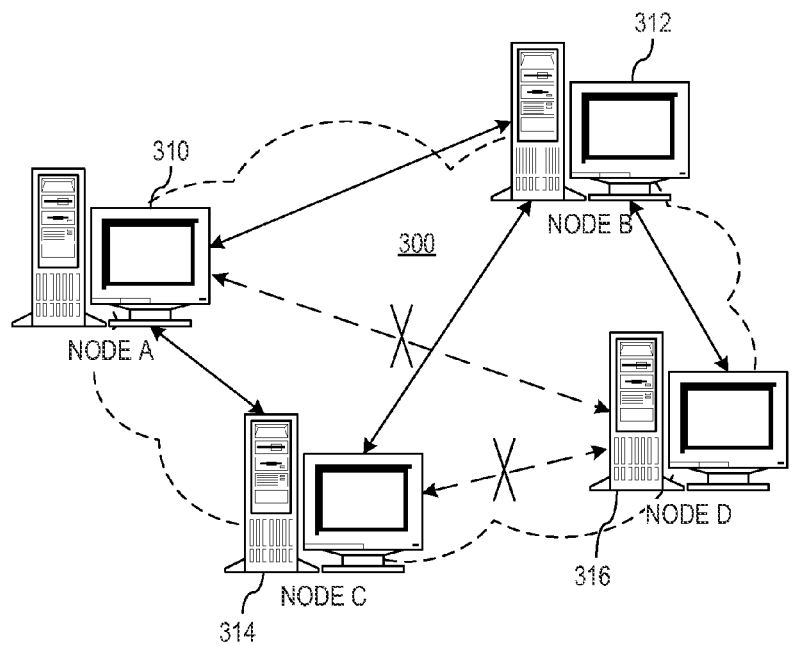
FIG. 3 is an example diagram of a cluster of computing devices in accordance with one illustrative embodiment.

FIG. 3 is an example diagram of a cluster of computing devices in accordance with one illustrative embodiment. The cluster 300 in FIG. 3 is a simplified cluster of nodes comprising only four nodes A-D 310-316 but it should be appreciated that the cluster 300, in actuality, may comprise many more nodes than that depicted here, hundreds or even thousands of nodes. The nodes, which may be server computing devices, client computing devices, or other types of computing devices, preferably have communication connections for communicating control and data messages between them. The nodes 310-316 are further configured with the critical section access control mechanisms of the illustrative embodiments described herein and depicted, for example, in FIG. 4.

In the depicted example, node A 310 is aware of only nodes B 312 and C 314 and cannot perceive the node D 316 as being a member of the cluster 300. Thus, node A 310 will send access notifications or requests to only nodes B 312 and C 314 requesting approval of node A's access to the critical section or shared resource. Nodes B 312 and C 314 may not be in a critical section while node D 316 may actually be in the critical section of code. Thus, nodes B 312 and C 314 would approve, or grant, node A's access to the critical section or shared resource, and as a result, nodes A 310 and D 316 may both be in the critical section simultaneously and would have simultaneous access to the corresponding shared resource. This may lead to data corruption issues when the shared resource is expected to be accessed in a serial manner by nodes of the cluster, e.g., a node must obtain a lock on the shared resources and have exclusive access while performing operations with regard to the shared resource.

In order to implement the mechanisms of the illustrative embodiments, the nodes of the cluster, e.g., node A 310 for illustrative purposes, implements a quorum inhibitor following UP status that causes the node to inhibit the sending of access notifications/requests when it is determined that a quorum of nodes is not present in the cluster 300. That is, in response to a node being transitioned to an UP state in the cluster 300, e.g., after booting, re-boot, adding of the node to the cluster, or the like, the node determines if it has received heartbeat messages from other nodes in the cluster 300 such that it knows that a quorum of nodes are present and in an active state in the cluster 300, e.g., in an UP or DOWNBEAT state. The nodes 310-316 are configured a priori with information indicating the total number of nodes in the cluster 300 such that a quorum can be determined. The quorum may be considered to be at least half of the nodes of the cluster 300, three-quarters of the nodes in the cluster 300, or any other desired predetermined number of nodes in the cluster 300. In one example, node A 310, upon booting, may check to determine if at least three nodes are in an active state in the cluster 300 shown in FIG. 3.

If quorum of nodes is not active, then the node may initiate a timer to measure a predetermined delay time period following the node being brought to an up state in the cluster 300. The predetermined delay time must expire before the node is once again allowed to request access to the critical section of code, and thus, the shared resource. The delay time period is a tunable value as previously mentioned above. During this predetermined delay time period, cluster-wide access is denied at the sender node itself, i.e. the sending of access notifications/requests is inhibited at the sender node. After this predetermined delay time period has expired a node may assume it is the only node UP in the cluster and go ahead with access to the critical section. Alternatively, this process may be repeated if a quorum is again not able to be achieved. If the quorum is not achieved within a predetermined number of attempts, e.g., resetting of the delay timer, then an error notification may be sent to a system administrator workstation or other type of notification may be generated to contact appropriate personnel to rectify the error, or the node may assume that it is the only node that is in an UP state in the cluster and go ahead with access to the critical section.

In addition to the quorum inhibitor following UP status engine, the illustrative embodiments further implement a cluster view exchange mechanism and self denial of access mechanism. The cluster view exchange mechanism assists in ensuring that it is safe for a node to enter a critical section of code, and thus access a shared resource that requires sequential access, even when the other nodes of the cluster approve the access to the critical section. The cluster view exchange mechanism is provided in each node of a cluster and operates to exchange information between the node and other nodes of the cluster indicating how many other nodes in the cluster the node perceives as being operational, i.e. in an active state (either UP or in a DOWNBEAT state).

In accordance with the illustrative embodiments, to ensure that a sender node does not rely just on the receiver nodes' responses granting the sender node's requested access to the critical section or shared resource, when nodes respond to an access notification or request, in addition to sending the response indicating whether the access requested is granted or denied, the cluster view exchange mechanism maintains a registry of what other nodes the current node can perceive as being in an active state. This information is inserted into the response to the access notification/request by the cluster view exchange mechanism and the resulting response is transmitted back to the sender node. Thus, in the example of FIG. 3, as discussed above, in response to an access notification/request from node A, node B sends the response <3, 1, OK> indicating that the number of UP nodes is 3 (e.g., nodes B, C, and D), the number of DOWNBEAT nodes is 1 (e.g., node A), and access is granted or "OK." Similarly, node C sends a response of <2, 1, OK>, indicating 2 UP nodes (e.g., nodes B and C), 1 DOWNBEAT node (e.g., node A), and access is granted or "OK."

The sender node, when receiving such responses from the receiving nodes in the cluster, compares the number of active nodes perceived by the receiving nodes to the number of active nodes perceived by the sender node. If the sender node determines that there is a discrepancy between these numbers of active nodes, then the sender node will deny itself access to the critical section or shared resource even though the receiver nodes have responded with a grant of the requested access. Thus, for example, node A sums the number of nodes that are active for each responding node to determine a corresponding active node count for that responding node with the results being that the number of active nodes perceived by node B is 4 and for node C is 3. These numbers of active nodes is compared to the sender node's own perceived number of active nodes, e.g., 3 in this case. In this example, the sender node, i.e. node A, active node count matches with node C's active node count but does not match node B's active node count. As a result, since there is not a consistent view of the cluster by all of the nodes, there is the possibility that node A did not send its access notification/request to a node in the cluster that may be in the critical section or accessing the shared resource. Thus, the self denial of access mechanism of node A denies itself access to the critical section or shared resource even though both nodes B and C indicated approval of the access. As mentioned previously, it should be appreciated that if the sender node perceives a larger number of active nodes than all of the responding receiver nodes, then the self denial of access mechanism of the sender node may grant itself access rather than performing the self denial of access since the sender node has a larger visibility of the cluster than the responding receiver nodes.

In addition to the above mechanisms, the illustrative embodiments further provide an asymmetric view timer mechanism in nodes of the cluster for initiating a timer to inhibit the transmission of access notifications/requests and positive responses to other nodes' access notifications/requests. That is, if a node determines that it has an asymmetric view of the cluster, e.g., the number of active nodes it perceives as part of the cluster is inconsistent with the number of active nodes perceived by other nodes in the cluster, the node may initiate an asymmetric view timer via the asymmetric view timer mechanism of the node. The asymmetric view timer mechanism of the node may periodically check its view of the cluster to determine if this asymmetric view persists. During the time interval measured by the timer, the node is in a vulnerable state and should avoid accessing critical sections and shared resources. Thus, sending of access notifications/requests are inhibited during this time interval until such time as the node determines that it no longer has an asymmetric view or until the timer expires. Thus, prior to sending out an access notification/request, the sender node may check to see if the timer has been started. If the timer has been started, the sender node may deny itself access to the critical section/shared resource and inhibit the sending of access notifications/requests. In addition, the node may not approve other node's requests and instead will automatically respond with a denial of any received access notification/request from other nodes of the cluster. If the asymmetric view discontinues, the timer may be canceled and normal operation of the node may be resumed.

Figure 4:
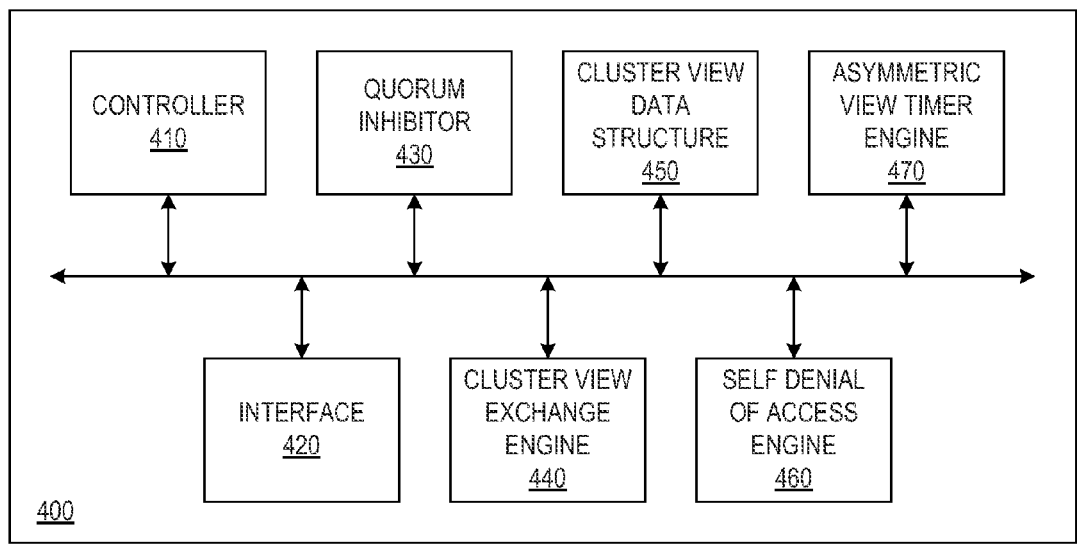
FIG. 4 is an example block diagram of the primary operational elements of a critical section access control engine in accordance with one illustrative embodiment.

FIG. 4 is an example block diagram of the primary operational elements of a critical section access control engine in accordance with one illustrative embodiment. The elements may be implemented in one or more nodes, e.g., computing devices, processors, data processing systems, or the like, of a network of nodes, e.g., a cluster, the Internet, or the like. In one illustrative embodiment, the network is a cluster of nodes with each node in the cluster implementing its own local version of the critical section access control engine. The elements of the critical section access control engine may be implemented in software executed by one or more processors of a computing device, hardware, or any combination of software and hardware. In one illustrative embodiment, the elements in FIG. 4 are implemented as software instructions executed on one or more processors of a node of a network.

As shown in FIG. 4, the critical section access control engine 400 comprises a controller 410, an interface 420, a quorum inhibitor 430, a cluster view exchange engine 440, a cluster view data structure 450, a self denial of access engine 460, and an asymmetric view timer engine 470. The controller 410 controls the overall operation of the critical section access control engine 400 and orchestrates the operation of the other elements of the critical section access control engine 400. The interface 420 provides a communication pathway through which data and control messages may be passed between the node and other nodes of the network (cluster).

The quorum inhibitor 430 performs the operations described above with regard to determining if a quorum of other nodes is active. The quorum inhibitor 430 also operates to inhibit the sending of access notifications/requests during a predetermined delay time period.

The cluster view exchange engine 440 performs the operations previously described above for inserting active node information into a response to an access notification/request from another node in the cluster. The information used to insert the active node information into the response may be obtained from the storing of the node's cluster view in the cluster view data structure 450. The information stored in the cluster view data structure 450 is generated from the heartbeat messages received from other nodes in the cluster. The heartbeat messages indicate which nodes are active in the cluster and whether those nodes are in an UP state or DOWNBEAT state. A node receives heartbeat messages from other nodes that the current node can perceive in the cluster.

The self denial of access engine 460 performs the above described self denial operations for self-denying the node's own access notifications/requests in response to other nodes responding with active node information that differs from the current node's own view of active nodes in the cluster. However, if the current node's view of the cluster comprises more active nodes than the other nodes can perceive, then the self denial of access engine 460 may permit access rather than self deny access.

The asymmetric view timer engine 470 performs the above described operations for initiating a timer to inhibit the transmission of access notifications/requests and positive responses to other nodes' access notifications/requests when it is determined that the node has an asymmetric view of the cluster. The inhibiting of the transmission of access notifications/requests and positive responses continues for a period of time measured by the timer. The asymmetric view timer engine 470 periodically checks its view of the cluster to determine if this asymmetric view persists and canceling the timer in the event that the asymmetric view no longer persists.

Figure 5:
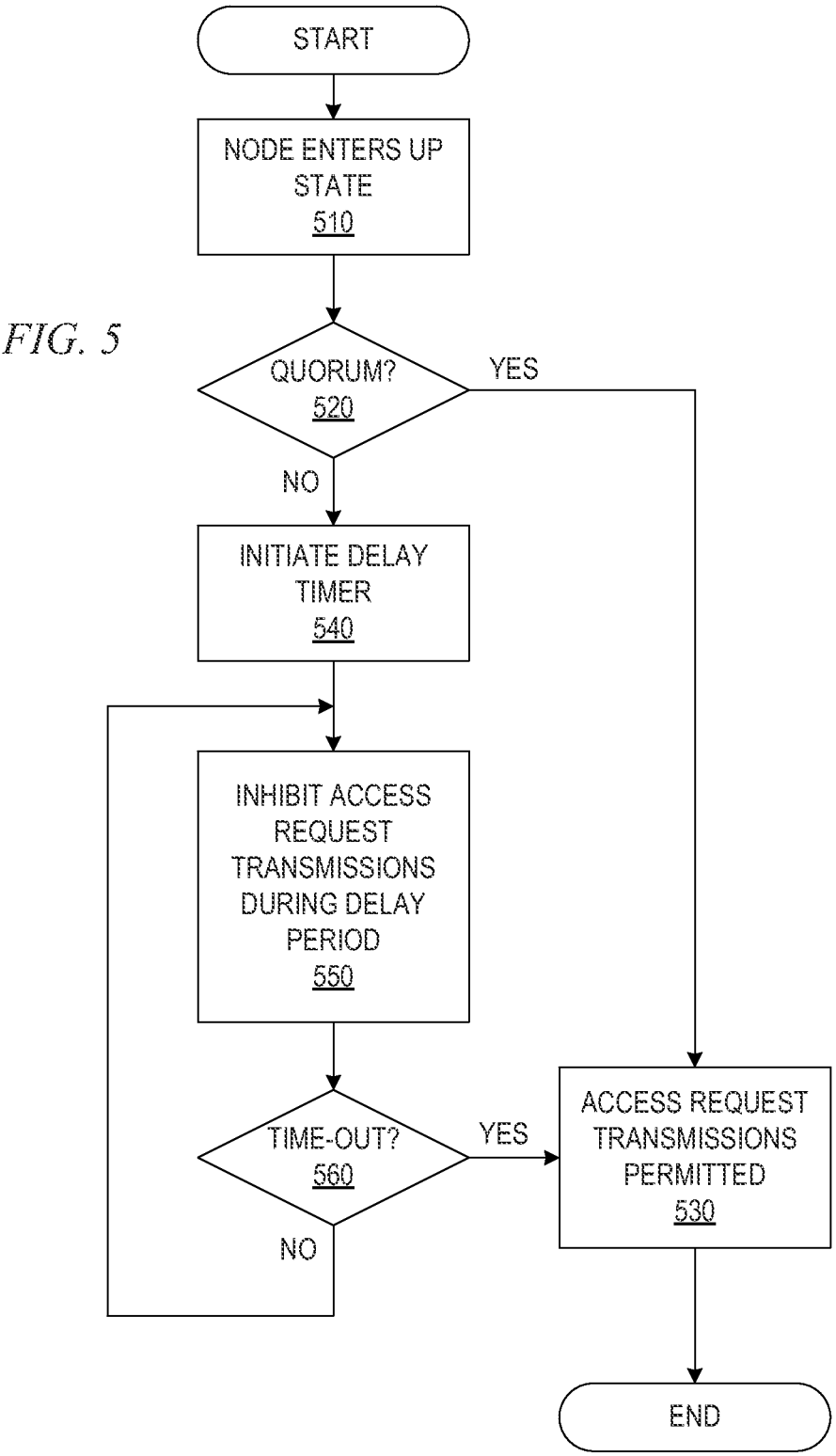
FIG. 5 is a flowchart outlining an example operation for inhibiting the transmission of an access request after a node comes up in accordance with one illustrative embodiment.

FIG. 5 is a flowchart outlining an example operation for inhibiting the transmission of an access request after a node comes up in accordance with one illustrative embodiment. As shown in FIG. 5, the operation starts by the node entering an UP state, such as after a boot operation, reboot operation, or other operation for adding the node to a cluster (step 510). The node determines if there is a quorum of other nodes in an active state of operation in the cluster (step 520). If there is a quorum of nodes in an active state, then access request transmission is permitted (step 530). If there is not a quorum of nodes in an active state, a delay timer is initiated (step 540) and transmission of access requests is inhibited while the timer is counting a predetermined time interval (step 550). A determination is made as to whether the timer has timed-out, e.g., reached a minimum or maximum value (step 560). If the timer has timed-out, then transmission of the access request is permitted (step 530). The operation then terminates.

Figure 6:
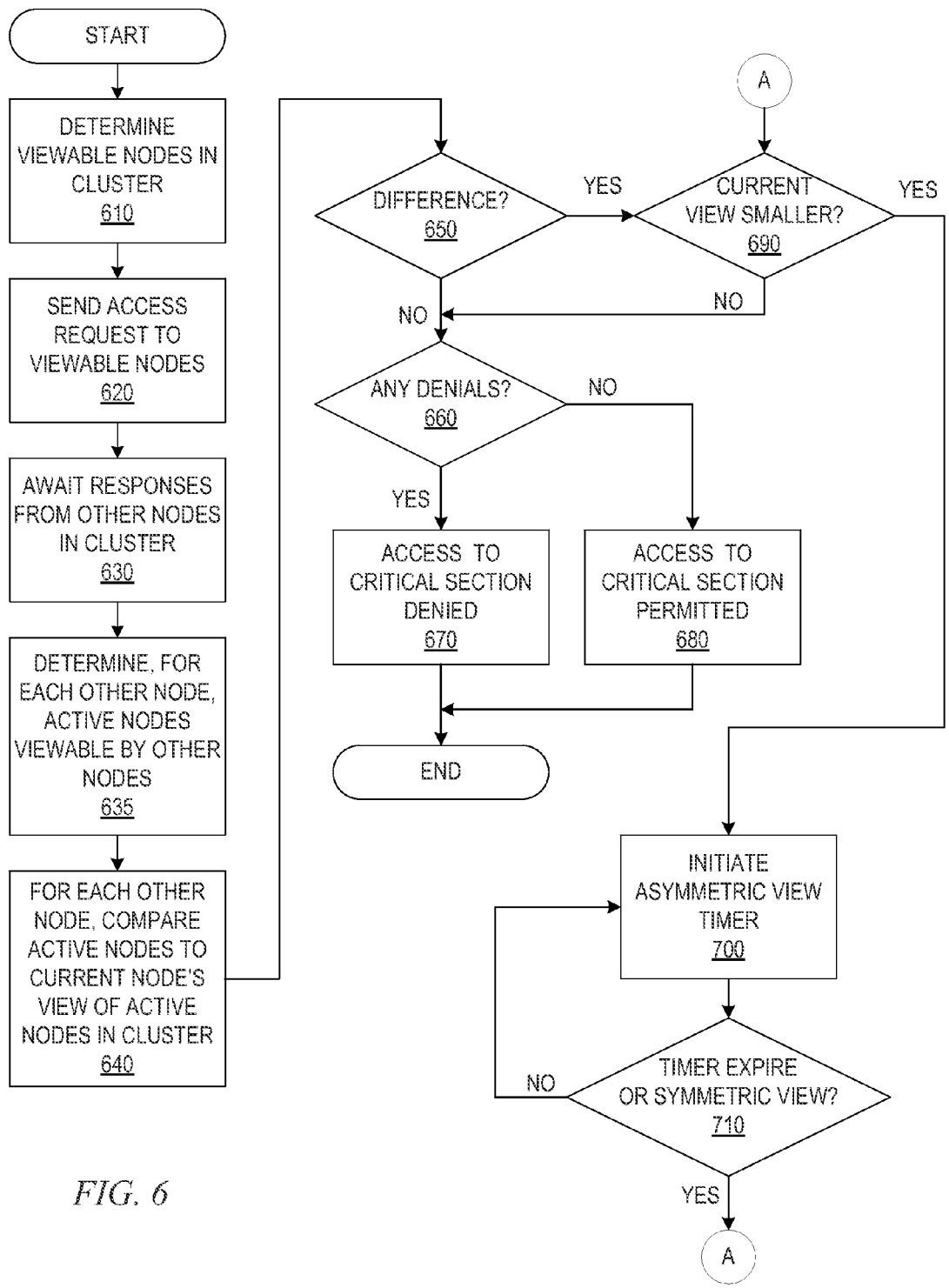
FIG. 6 is a flowchart outlining an example operation for critical section access control in accordance with one illustrative embodiment.

FIG. 6 is a flowchart outlining an example operation for critical section access control in accordance with one illustrative embodiment. The operation starts by determining the nodes of the cluster that are viewable by the present node (step 610). The nodes that are viewable by the present node are determined from a cluster view data structure that is populated with information from heartbeat messages received from other nodes in the cluster.

The present node sends an access request out to the nodes of the cluster that are viewable by the present node (step 620) and the present node waits for responses from the other nodes (step 630). The active node information from received responses is compiled (step 635) and each other node's indication of active nodes viewed in the cluster is compared to the number of active nodes viewable by the present node (step 640). A determination is made as to whether there is a discrepancy between the number of active nodes viewable by the present node and the active nodes viewable by the other nodes (step 650). If not, then a determination is made as to whether any of the other nodes have responded that access is denied (step 660). If so, then the access request is denied and access to the critical section is inhibited (step 670). If none of the other nodes have responded that access is denied, then access to the critical section is permitted and the present node accesses the critical section (step 680).

If there is a discrepancy in step 650, a determination is made as to whether the discrepancy indicates that the present node has a smaller number of viewable nodes than one or more other nodes in the cluster (step 690). If not, then the operation goes to step 660. If the present node has a smaller number of viewable nodes than one or more other nodes in the cluster, then an asymmetric view timer is initiated (step 700). A determination is made as to whether the asymmetric view has terminated or if the asymmetric view timer has expired (step 710). If either has happened, the operation returns to step 690.

It should be appreciated that while FIG. 6 illustrates a loop operation with regard to step 710 and the return to step 690, in other illustrative embodiments, rather than looping back and repeatedly checking the node's view of the cluster to determine if there is an asymmetric view, instead the node may simply shut down its operation and periodically check its view of the cluster to determine if the asymmetric view persists. If the asymmetric view discontinues, then the node may begin its normal operation of sending out requests for shared resource access again.

Thus, the illustrative embodiments provide mechanisms for granting access to shared resources and more specifically to accessing a critical section of code that in turn accesses a shared resource. The illustrative embodiments provide mechanisms for addressing the three main considerations noted above with regard to how soon after a node comes up that access requests should be allowed to be transmitted, determining if it is safe for a node to enter a critical section even when other nodes indicate approval of such access to the critical section, and determining when a node should not request access to a critical section. The illustrative embodiments extend the Ricart-Agarwala algorithm in these three areas.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer readable storage medium having a computer readable program stored therein, wherein the computer readable program, when executed in a sender node of a data processing system, causes the sender node to:
   send an access request for requesting access to the critical section of code, wherein the critical section of code is a portion of code that accesses a shared resource;
   receive, from a plurality of receiver nodes in the data processing system, responses to the access request, wherein each response in the responses includes a number of active nodes perceived by a corresponding receiver node that transmitted the response; and
   control access to the critical section of code based on the number of active nodes identified in each of the responses received from the receiver nodes.

2. The computer program product of claim 1, wherein the access request is sent by the sender node to receiver nodes, in the plurality of nodes, that are viewable by the sender node as being members of a cluster of nodes.

3. The computer program product of claim 2, further comprising:
   in response to the sender node entering an up state, determining if a number of nodes viewable by the sender node as being members of the cluster of nodes represents a quorum of nodes in the plurality of nodes; and
   in response to the number of nodes viewable by the sender node not being a quorum of nodes, inhibiting the sending of the access request.

4. The computer program product of claim 3, wherein inhibiting the sending of the access request comprises:

initiating a tunable delay timer that measures a tunable delay timeout period of time during which the sending of the access request is inhibited; and sending the access request in response to the tunable delay timeout period of time expiring.

5. The computer program product of claim 1, wherein controlling access to the critical section of code based on the number of active nodes identified in each of the responses received from the receiver nodes comprises, for each response received from a receiver node:

comparing, by the sender node, a first number of active nodes indicated in the response to a second number of active nodes viewable by the sender node; and self denying, by the sender node, access to the critical section of code in response to a discrepancy between the first number of active nodes and the second number of active nodes.

6. The computer program product of claim 5, further comprising:

permitting, by the sender node, access to the critical section of code in response to each first number of active nodes in each response received from receiver nodes being equal to or less than the second number of active nodes.

7. The computer program product of claim 5, further comprising:

in response to the second number of active nodes being smaller than any of the first number of active nodes in any of the responses received from the receiver nodes:

initiating an asymmetric view timer; and inhibiting sending of access requests by the sender node during a time period measured by the asymmetric view timer.

8. The computer program product of claim 7, further comprising:

inhibiting responses indicating access granted, by the sender node, to access requests from other nodes in the plurality of nodes, during the time period measured by the asymmetric view timer.

9. The computer program product of claim 1, wherein the response of the corresponding receiver node comprises a number of nodes in an up state perceived by the corresponding receiver node, a number of nodes in a downbeat state perceived by the corresponding receiver node, and an indicator of whether the corresponding receiver node consents to access by the sender node to the shared resource.

10. An apparatus comprising:

a processor; and a memory coupled to the processor, wherein the memory comprises instructions which, when executed by the processor, cause the processor to operate as a sender node and to:

send an access request for requesting access to the critical section of code, wherein the critical section of code is a portion of code that accesses a shared resource;

receive, from a plurality of receiver nodes in a data processing system, responses to the access request, wherein each response in the responses includes a number of active nodes perceived by a corresponding receiver node that transmitted the response; and control access to the critical section of code based on the number of active nodes identified in each of the responses received from the receiver nodes.

11. The apparatus of claim 10, wherein the access request is sent by the sender node to receiver nodes, in the plurality of nodes, that are viewable by the sender node as being members of a cluster of nodes.

12. The apparatus of claim 11, wherein the instructions further cause the processor to:

in response to the sender node entering an up state, determine if a number of nodes viewable by the sender node as being members of the cluster of nodes represents a quorum of nodes in the plurality of nodes; and in response to the number of nodes viewable by the sender node not being a quorum of nodes, inhibit the sending of the access request.

13. The apparatus of claim 12, wherein inhibiting the sending of the access request comprises:

initiating a tunable delay timer that measures a tunable delay timeout period of time during which the sending of the access request is inhibited; and sending the access request in response to the tunable delay timeout period of time expiring.

14. The apparatus of claim 10, wherein the instructions cause the processor to control access to the critical section of code based on the number of active nodes identified in each of the responses received from the receiver nodes at least by, for each response received from a receiver node:

comparing, by the sender node, a first number of active nodes indicated in the response to a second number of active nodes viewable by the sender node; and self denying, by the sender node, access to the critical section of code in response to a discrepancy between the first number of active nodes and the second number of active nodes.

15. The apparatus of claim 14, wherein the instructions further cause the processor to:

permit, by the sender node, access to the critical section of code in response to each first number of active nodes in each response received from receiver nodes being equal to or less than the second number of active nodes.

16. The apparatus of claim 14, wherein the instructions further cause the processor to:

in response to the second number of active nodes being smaller than any of the first number of active nodes in any of the responses received from the receiver nodes:

initiate an asymmetric view timer; and inhibit sending of access requests by the sender node during a time period measured by the asymmetric view timer.

17. The apparatus of claim 16, wherein the instructions cause the processor to:

inhibit responses indicating access granted, by the sender node, to access requests from other nodes in the plurality of nodes, during the time period measured by the asymmetric view timer.

18. The apparatus of claim 10, wherein the response of the corresponding receiver node comprises a number of nodes in an up state perceived by the corresponding receiver node, a number of nodes in a downbeat state perceived by the corresponding receiver node, and an indicator of whether the corresponding receiver node consents to access by the sender node to the shared resource.

* * * * *